United States Patent [19]

Beckey et al.

[11] Patent Number: 4,878,355
[45] Date of Patent: Nov. 7, 1989

[54] METHOD AND APPARATUS FOR IMPROVING COOLING OF A COMPRESSOR ELEMENT IN AN AIR CONDITIONING SYSTEM

[75] Inventors: Thomas J. Beckey, Edina; Lorne W. Nelson, Bloomington, both of Minn.

[73] Assignee: Honeywell Inc., Minneapolis, Minn.

[21] Appl. No.: 315,986

[22] Filed: Feb. 27, 1989

[51] Int. Cl.$^4$ ............................................. F25B 41/00
[52] U.S. Cl. ........................................ 62/115; 62/212; 62/222; 62/505
[58] Field of Search ................. 62/212, 225, 222, 505, 62/115

[56] References Cited

U.S. PATENT DOCUMENTS

| | | | |
|---|---|---|---|
| 3,859,815 | 1/1975 | Kasahara | 62/505 X |
| 4,261,180 | 4/1981 | Nozawa et al. | 62/222 X |
| 4,620,424 | 11/1986 | Tanaka et al. | 62/222 |

Primary Examiner—William E. Wayner
Attorney, Agent, or Firm—Mitchell J. Halista; Clyde C. Blinn; Albin Medved

[57] ABSTRACT

A method for improving cooling of a compressor element used in an air conditioning system and having a refrigerant compressor and associated drive motor hermetically sealed in a fluid-tight shell includes the steps of detecting an excessive increase in the temperature of the compressor element, intermittently operating the system during the excessive temperature detection with a superheat of a refrigerant in the system below zero superheat degrees to concurrently allow liquid refrigerant to enter the shell to enhance the cooling of the compressor apparatus by the latent heat of vaporization of the liquid refrigerant and terminating the intermittent operation and the admittance of the liquid refrigerant into the compressor element upon a detection of a desired temperature of operation of the compressor element. An air conditioning apparatus utilizing this method includes a device for introducing an intermittent perturbation into the control of an expansion valve located in a refrigerant flow line in the air conditioning apparatus. The control of this valve is based on a desired superheat of the refrigerant. The device may include either the introduction of a cyclic or sinusoidal variation in a superheat setpoint used for control of the expansion valve or the introduction of a cyclic variation in the gain of a superheat controller having an output signal controlling the expansion valve.

12 Claims, 2 Drawing Sheets

METHOD AND APPARATUS FOR IMPROVING COOLING OF A COMPRESSOR ELEMENT IN AN AIR CONDITIONING SYSTEM

BACKGROUND OF THE INVENTION

1. Field of the Invention

The present invention relates to an air conditioning system. More specifically, the present invention is directed to a method and apparatus for improving the cooling of a sealed compressor element used in an air conditioning system.

SUMMARY OF THE INVENTION

An object of the present invention is to provide an improved air conditioning system having enhanced cooling of a compressor element.

In accomplishing this and other objects, there has been provided, in accordance with the presen invention, a method for improving cooling of a compressor element used in an air conditioning system and having a refrigerant compressor and associated drive motor sealed in a fluid-tight shell includes the steps of detecting an excessive increase in the temperature of the compressor element, intermittently operating the system during an occurrence of the excessive temperature detection with a superheat of a refrigerant in the system below zero superheat degrees concurrently allow liquid refrigerant to enter the shell to enhance cooling of the compressor element by the latent heat of vaporization of the liquid refrigerant and terminating the intermittent operation and the admittance of the liquid refrigerant into the compressor element upon the detection of a desired temperature of operation of the compressor element. An air conditioning system using this method includes an indoor heat exchanger, an outdoor heat exchanger, a first refrigerant line connecting one end of the heat exchanger with one end of the outdoor heat exchanger, compressor means, a second refrigerant line connecting the other end of the indoor heat exchanger to an inlet of the compressor means, a third refrigerant line connecting an outlet of the compressor means to the other end of the outer heat exchanger, a controllable expansion valve located in the first refrigerant line, means for sensing the superheat of the refrigerant in the indoor heat exchanger, a temperature sensor for sensing the temperature of the compressor means and a controller responsive to the temperature sensor and the means for sensing the superheat for controlling the expansion valve whereby the expansion valve is intermittently operated to provide below zero superheat degrees of the refrigerant in the indoor heat exchanger during the detection of an excessive temperature by the temperature sensor.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENTS

Figure 1:
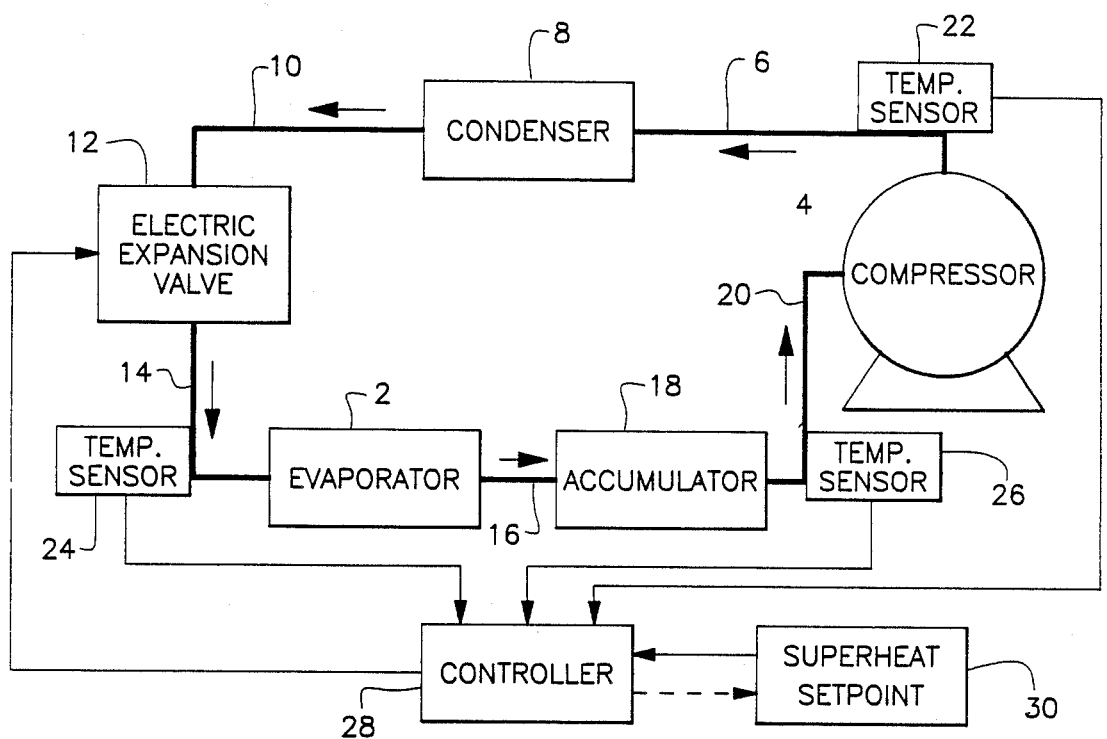
FIG. 1 is a simplified pictorial illustration of an air conditioning system shown in a cooling mode and incorporating an example of the present invention.

Referring to FIG. 1 in more detail, there is shown a simplified pictorial illustration of an air conditioning system arranged in a cooling mode and having an indoor heat exchanger 2 which may include a refrigerant carrying coil and an indoor coil fan (not shown). These elements are conventionally referred to as indoor elements inasmuch as they are usually associated with the interior of the enclosure or space to be conditioned by the flow of indoor air over the heat exchanger 2 during the operation thereof. Since the system shown in the illustration of FIG. 1 is depicted in a cooling mode of operation, the indoor heat exchanger 2 is used as an evaporator to cool the indoor air in the enclosure or space. In a converse or heating mode of operation, the flow of refrigerant is conventionally reversed by a four-way reversing valve (not shown), and the indoor heat exchanger is then used as a condenser to heat the flow of air within the conditioned space of enclosure. The present invention is applicable to both modes of operation. An air conditioning system utilizing both modes of operation with the aforesaid reversing valve used to selectively switch from one mode of operation to the other is conventionally designated as a heat pump, e.g., the system shown in U.S. Pat. No. 3,115,018. The operation of such reversing valves is well-known in the art as discussed in the aforesaid patent and basically provides a reversal of the evaporator-condenser functions of the indoor and outdoor heat exchangers to selectively provide corresponding heating and cooling modes of operation.

A compressor element 4 is used to supply a compressed refrigerant though a first refrigerant line 6 to the inlet of an outdoor heat exchanger 8. The compressor element 4 includes a refrigerant compressor and an associated drive motor sealed in a fluid-tight hermetic shell having fluid ports and electrical connections extending therein. An outlet line 10 from the outdoor heat exchanger 8 is connected to an inlet of a controllable expansion valve 12. An outlet of the expansion valve 12 is connected through a third refrigerant line 14 to the inlet of the evaporator 2. The outdoor heat exchanger 8 may also have a coil and a fan (not shown) associated therewith. Since these elements are usually arranged externally of the enclosure to be conditioned by the operation of the air conditioning apparatus, they are referred to as outdoor elements. A fourth refrigerant line 16 is connected between an outlet of the evaporator 2 to an inlet of a refrigerant fluid accumulator 18. A fifth refrigerant line 20 is connected between an outlet of the accumulator 18 and an inlet of the compressor 4. The aforesaid four-way reversing valve (not shown) is usually arranged in the flow lines 6 and 16 to change the direction of refrigerant flow between heating and cooling modes, respectively.

A first temperature sensor 22 is arranged to sense the temperature of the refrigerant in the first refrigerant line connected to the outlet of the compressor element 4. A second temperature sensor 24 is arranged to sense the temperature of the refrigerant in the refrigerant line 14 entering the evaporator 2, and a third temperature sensor 26 is arranged to sense the temperature of the refrigerant in the fifth refrigerant line 20 of the refrigerant entering the compressor element 4. The temperature sensors 22, 24 and 26 may each be any suitable device for measuring temperature, e.g., a thermistor arranged in close thermal contact with the refrigerant, such devices being well-known in the art. The temperature representative signals from the temperature sensors 22, 24 and 26 are applied to a system controller 28. Additionally, a superheat setpoint signal from a superheat setpoint signal source 30 is also applied to the controller 28.

An output signal from the controller 28 is used to control the expansion valve 12 which may be any suitable electrically controlled expansion valve such as the Type K, Series ELCV manufactured by Fuji Koki Manufacturing Co., Ltd. of Japan. The controller 28 may be any suitable control circuit for effecting a controller output response to input and reference signals applied thereto, such as a well-known PID controller. The operation of such controllers is well-known in the art and requires no further explanation for a complete understanding of the present invention.

The enhanced cooling provided by the method of the present invention is based on extracting the latent heat of vaporization of the liquid refrigerant which is intermittently introduced into the compressor element shell containing the refrigerant compressor and drive motor. While such a sealed system normally has the refrigerant in a gaseous state flowing therethrough for cooling the compressor and drive motor, such a normal cooling operation does not provide for enhancing or augmenting the cooling of the compressor apparatus during periods of excess cooling or heating load on the compressor which would produce a rise in the temperature of the compressor element, e.g., the drive motor windings. The present invention, accordingly, is effective to introduce, on an intermittent basis, a liquid form of the refrigerant into the compressor element shell to enhance the cooling of the compressor and drive motor by extracting the latent heat vaporization of the liquid refrigerant. The refrigerant is introduced on an intermittent basis to avoid "slugging" of the compressor which could damage the compressor and to avoid other undesirable effects such as the liquid refrigerant dissolving into the lubrication components of the compressor and drive motor which would affect their lubricating qualities.

Figure 2:
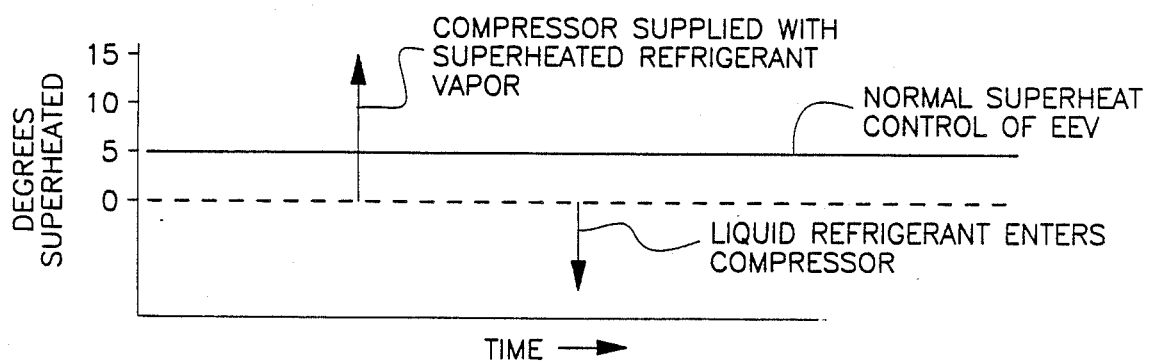
FIG. 2 is a graph showing the superheat control of the expansion valve.

Referring to FIG. 2, there is shown a graph showing the operation of the expansion valve 12 based on superheat control by the controller 28 with reference to a superheat setpoint signal supplied from the superheat setpoint signal reference source 30. As shown in FIG. 2, the normal superheat control of the electrically controlled expansion valve (EEV) 12 is performed with respect to a level of positive or above zero degrees of superheat, e.g., five, which is determined with reference to a superheat setpoint reference signal supplied from the setpoint source 30. In general, the refrigerant's superheat is defined as the temperature of the refrigerant entering the compressor element 4 minus the temperature of the refrigerant entering the evaporator 2 if no refrigerant pressure drop is experienced between the evaporator and the compressor element 4. If a pressure drop does occur between the evaporator 2 and the compressor element 4, a correction factor can be then subtracted to provide the true superheat at the compressor 4. The temperatures of the refrigerant to define the superheat are measured by the second and third temperature sensors 24 and 26, respectively. As shown in FIG. 2, liquid refrigerant would enter the compressor element 4 when the control of the EEV 12 is based on negative superheat degrees, i.e., below zero.

Figure 3:
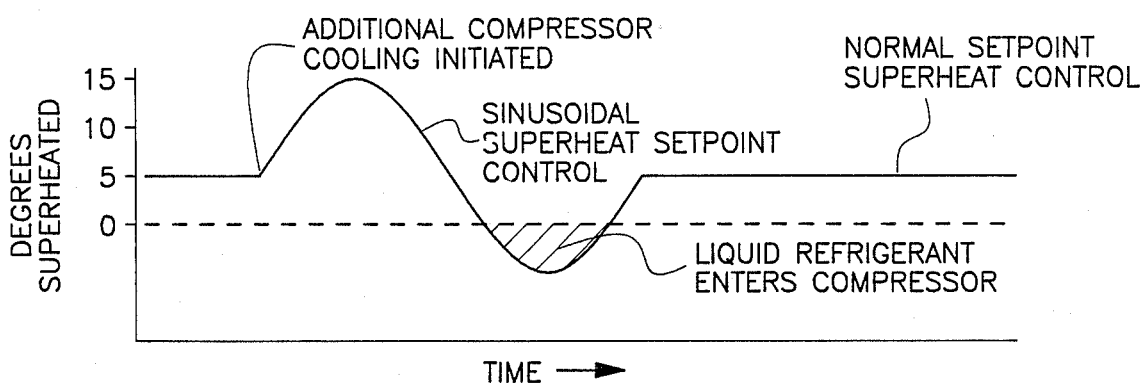
FIG. 3 is a graph showing the superheat control of the expansion valve in a first embodiment of the method of the present invention.

In FIG. 3, there is shown a graphical illustration of the operation of the system of FIG. 1 based on a first embodiment of the method of the present invention utilizing an introduction of a variation in the normal setpoint superheat control by using a variable, e.g., sinusoidal, superheat setpoint signal from the setpoint source 30. This variation allows the setpoint value to fall below zero degrees superheat for part of the expansion valve control time during which time the liquid refrigerant is allowed to enter the shell of the compressor element 4. The timing of the two-phase flow into the compressor element shell is preferably at a frequency of five to thirty seconds.

The initiation of the disturbance into the normal setpoint superheat control is initiated, in the illustrated example, by an output from the first temperature sensor 22 as an indirect measurement of the temperature of the compressor 4. The temperature sensor 22 is arranged to sense the temperature of the refrigerant leaving the compressor element 4 in the refrigerant line 6. An excessive rise in this temperature, e.g., above a reference level, is representative of the need of augmented cooling of the compressor element 4 as a result of a heating of the refrigerant, e.g., by a rise in temperature of the windings of the compressor motor. Another indirect technique which could be employed to measure the temperature increase of the internal elements of the compressor element 4 would involve measuring the difference between the temperatures of the refrigerant entering and leaving the compressor element 4. A comparison of the temperature different with a reference level would then be employed to detect the presence of an abnormal temperature increase of the compressor 4. A direct measurement of a temperature increase of the compressor element 4, e.g., measuring the temperature of the motor windings, could also be employed to initiate the enhanced cooling of the present invention.

The output signal from the temperature sensor 22 is applied to the controller 28 to initiate the superheat control operation of the valve 12. Specifically, in the first embodiment of the invention the controller 28 is effective to introduce a periodic variation in the setpoint signal from the setpoint source 30 to produce the control operation illustrated in FIG. 3 after the additional compressor element cooling is initiated by the output from the temperature sensor 22. Since this introduction of the liquid refrigerant into the compressor element 4 is on an intermittent basis, the cooling of the compressor element 4 is enhanced without the aforesaid problems affecting the operation of the compressor element 4.

Figure 4:
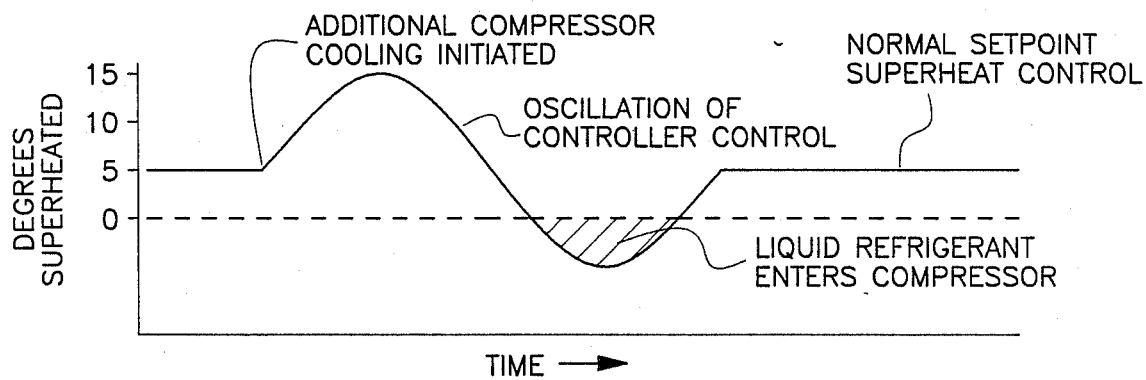
FIG. 4 is a graph showing the superheat control of the expansion valve in a second embodiment of the method of the present invention.
Figure 5:
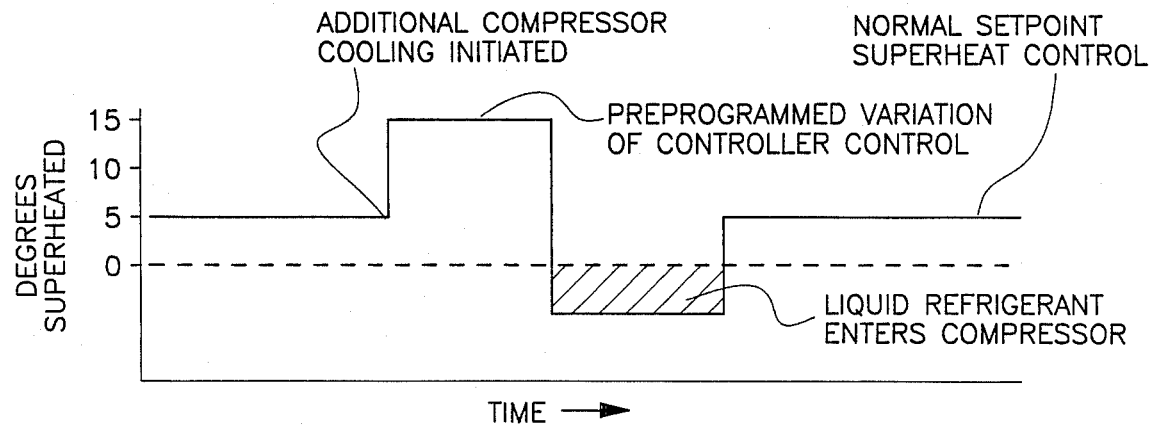
FIG. 5 is a superheat control of the expansion valve using a third embodiment of the method of the present invention.

In FIG. 4, there is shown a second embodiment of the method of the present invention wherein the controller 28 is intermittently activated by the output from the first sensor 22 to enter into a self-oscillatory mode of operation, e.g., variable gain. In this mode of operation, the expansion valve 12 is again controlled in an intermittent fashion to introduce the below zero superheat degrees operation whereby to concurrently enable liquid refrigerant to enter the compressor shell. In FIG. 5, there is shown a third embodiment of the method of the present invention wherein the controller 28 has a periodic or preprogrammed, i.e., non-self-oscillatory, gain variation initiated by the output from the first sensor 22. The effect of such a controller operation is also to intermittently introduce liquid refrigerant into the compressor element 4 concurrently with the below zero superheat degree of operation.

Accordingly, it may be seen that there has been provided, in accordance with the present invention, an improved method and apparatus for improving cooling of a compressor element in an air conditioning system.

The embodiments of the present invention in which an exclusive property or privilege is claimed are defined as follows:

1. A method for improving the cooling of a compressor element used in an air conditioning system and having a refrigerant compressor and associated drive motor sealed in a fluid-tight shell which includes the steps of detecting an excessive increase in the temperature of the compressor element, intermittently operating the system during an occurrence of the excessive temperature with a superheat of a refrigerant in the system below zero superheat degrees to concurrently allow liquid refrigerant to enter the compressor element shell to enhance cooling of the compressor element by the latent heat of vaporization of the liquid refrigerant and terminating the intermittent operation and the admittance of the liquid refrigerant into the compressor element upon the detection of a desired temperature of operation of the compressor element.

2. A method as set forth in claim 1 wherein the system includes a controllable expansion valve and a controller for controlling the expansion valve with respect to a superheat reference level and the step of intermittently operating the system includes the step of periodically introducing a variation of superheat degrees between above zero and below zero in a superheat reference level supplied to the controller.

3. A method as set forth in claim 1 wherein the system includes a controllable expansion valve and a controller for controlling the expansion valve with respect to a superheat reference level and the step of intermittently operating the system includes the step of periodically introducing an oscillatory variation in a signal gain of the controller to produce a superheat variation in the system between superheat degrees above zero and below zero.

4. A method as set forth in claim 1 wherein the system includes a controllable expansion valve and a controller for controlling the expansion valve with respect to a superheat reference level and the step of intermittently operating the system includes the step of periodically introducing a preprogrammed variation in a signal gain of the controller to produce a superheat variation in the system between superheat degrees above zero and below zero.

5. A method as set forth in claim 1 wherein the step of detecting an excessive increase in the temperature includes the steps of measuring the temperature of the refrigerant leaving the compressor element and comparing the measured temperature with a reference level temperature to detect the excessive increase.

6. A method as set forth in claim 1 wherein the step of detecting an excessive increase includes the step of indirectly measuring the temperature increase of the compressor element.

7. A method as set forth in claim 1 wherein the step of detecting an excessive increase includes the step of directly measuring the temperature increase of the compressor element.

8. An apparatus for improving cooling of a compressor element in an air conditioning system comprising
an indoor heat exchanger,
an outdoor heat exchanger,
a first refrigerant line connecting one end of said indoor heat exchanger with one end of said outdoor heat exchanger,
compressor means,
a second refrigerant line connecting the other end of said indoor heat exchanger to an inlet of said compressor means,
a third refrigerant line connecting an outlet of said compressor means to the other end of said outdoor heat exchanger,
a controllable expansion valve located in said first refrigerant line,
means for sensing the superheat of the refrigerant in said air conditioning system,
a temperature sensor for sensing the temperature of said compressor means and
a controller means responsive to said temperature sensor and said means for sensing the superheat for controlling said expansion valve whereby said expansion valve is intermittently operated to provide below zero superheat degrees of the refrigerant in said air conditioning system during the detection of an excessive temperature of said compressor means by said temperature sensor to allow a periodic entry of liquid refrigerant into said compressor means to augment cooling of said compressor means by the latent heat of vaporization of the liquid refrigerant.

9. An apparatus as set forth in claim 8 wherein said air conditioning system is a heat pump and includes a reversing valve for reversing a flow of the refrigerant between a heating and a cooling mode of operation.

10. An apparatus as set forth in claim 8 wherein said temperature sensor is arranged to sense the temperature of the refrigerant leaving said compressor means as an indirect measurement of the temperature of said compressor means.

11. An apparatus as set forth in claim 8 wherein said controller means is arranged to control said expansion valve to provide a normal superheat of the refrigerant during the detection of a desired temperature of said compressor means.

12. An apparatus as set forth in claim 8 wherein said controller means is arranged to vary the superheat between positive and negative superheat degrees during said intermittent operation of said expansion valve during said detection of an excessive temperature of said compressor means.

* * * * *